US012522311B2

(12) United States Patent
Xicola Serrano

(10) Patent No.: US 12,522,311 B2
(45) Date of Patent: Jan. 13, 2026

(54) MOTORCYCLE CASE HAVING AN ADJUSTABLE STORAGE VOLUME

(71) Applicant: Bayerische Motoren Werke Aktiengesellschaft, Munich (DE)

(72) Inventor: Jaume Xicola Serrano, Mollet del Vallés (ES)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 96 days.

(21) Appl. No.: 18/577,420

(22) PCT Filed: Jun. 8, 2022

(86) PCT No.: PCT/EP2022/065543
§ 371 (c)(1),
(2) Date: Jan. 8, 2024

(87) PCT Pub. No.: WO2023/280499
PCT Pub. Date: Jan. 12, 2023

(65) Prior Publication Data
US 2024/0351652 A1    Oct. 24, 2024

(30) Foreign Application Priority Data

Jul. 9, 2021    (DE) .................... 10 2021 117 825.8

(51) Int. Cl.
*B62J 9/00*    (2020.01)
*A45C 7/00*    (2006.01)
*B62J 9/20*    (2020.01)

(52) U.S. Cl.
CPC .............. *B62J 9/20* (2020.02); *A45C 7/0022* (2013.01)

(58) Field of Classification Search
CPC ......... B62J 9/20; B62J 9/26; B62J 9/00; B62J 1/10; A45C 7/0022
(Continued)

(56) References Cited

U.S. PATENT DOCUMENTS 2,128,174 A * 8/1938 Smith ................. B62J 9/21
224/450
4,630,717 A * 12/1986 Tong ................... A45C 7/0031
220/8
(Continued)

FOREIGN PATENT DOCUMENTS

EP    1 566 328 A2    8/2005

OTHER PUBLICATIONS

International Search Report (PCT/ISA/210) issued in PCT Application No. PCT/EP2022/065543 dated Aug. 18, 2022 (2 pages).
(Continued)

*Primary Examiner* — Jack W Lavinder
(74) *Attorney, Agent, or Firm* — Crowell & Moring LLP

(57) ABSTRACT

A motorcycle case includes an inner case part which is fastenable to a motorcycle and an outer case part connected to the inner case part that is displaceable laterally relative to the inner case part. A driven gearwheel mechanism couples the inner case part and the outer case part where a width of the motorcycle case is adjustable by displacing the outer case part relative to the inner case part. The gearwheel mechanism includes at least a first gearwheel group and a second gearwheel group which each have a plurality of gears coupled to one another, rotating together and assigned to an axis of rotation, where respective teeth of adjacent gearwheel groups mesh. The first gearwheel group and the second gearwheel group each have at least one spur gear and at least one bevel gear and either the spur gears or the bevel gears of adjacent gearwheel groups mesh.

11 Claims, 6 Drawing Sheets

(58) Field of Classification Search
USPC .................................. 224/446, 412, 413
See application file for complete search history.

(56) References Cited

U.S. PATENT DOCUMENTS

| | | | |
|---|---|---|---|
| 4,854,430 A * | 8/1989 | Peterson .............. | A45C 7/0022 190/110 |
| 6,575,272 B1 * | 6/2003 | Krulik .................. | A45C 7/0022 190/103 |

OTHER PUBLICATIONS

German Search Report issued in German Application No. 10 2021 117 825.8 dated Mar. 7, 2022, with partial English translation (6 pages).

* cited by examiner

MOTORCYCLE CASE HAVING AN ADJUSTABLE STORAGE VOLUME

BACKGROUND AND SUMMARY

The invention relates to a motorcycle case having an adjustable storage volume.

Motorcycle cases are usually arranged and fastened at the side or centrally behind a rider who is sitting on a motorcycle, in order to offer the rider sufficient storage volume for carrying motorcycle helmets or other objects with them. Depending on their envisaged arrangement, they are also known as side cases or rear cases.

These motorcycle cases have two shell-like case parts, which are preferably hard-shell case parts. The hard-shell cases formed therefrom are distinguished by particular ruggedness.

The prior art discloses motorcycle cases which have two case parts that are displaceable relative to each other, shell-like and inserted into each other and comprise a displacement mechanism with a gearwheel mechanism. These ruggedly designed case parts are hard-shell case parts, wherein their storage volume can be adapted to the individual use by the gearwheel mechanism.

By adapting the storage volume to the individual use, the overall width of a motorcycle can be reduced if only part of the storage volume is needed. In consequence, this makes the maneuvering and parking of the motorcycle easier if the maximum storage volume is not needed.

In addition, the air resistance plays a critical role in a motorcycle case. A motorcycle case with a small air impingement surface leads to a lower air resistance as compared with a large air impingement surface, and thus to a lower fuel consumption of the motorcycle.

However, it has proven to be disadvantageous that in these motorcycle cases, no aerodynamic design with a simultaneously maximum storage volume is possible, since the known motorcycle cases with a gearwheel mechanism have a virtually flat wall on their side facing the airstream, a convex wall being required for an aerodynamic design.

Starting from this point, the object of the invention is to further develop such a variable motorcycle case with a gearwheel mechanism. The intention is to achieve an aerodynamic design with simultaneous maximization of the storage volume. In addition, certain components of the gearwheel mechanism are intended to be able to be used both for a motorcycle case which is conceived as a side case and also for a motorcycle case which is conceived as a rear case.

This object is achieved by a motorcycle case having an inner case part which can be fastened to a motorcycle, and an outer case part which is connected to the inner case part and can be displaced laterally relative to the inner case part, and a driven gearwheel mechanism coupling the case parts. This gearwheel mechanism can adjust the width and thus the storage volume of the motorcycle case by displacing the outer case part relative to the inner case part, wherein the gearwheel mechanism comprises at least a first and a second gearwheel group, which each have a plurality of gears coupled to one another, rotating together and assigned to an axis of rotation. The teeth of adjacent gearwheel groups mesh, wherein the gearwheel groups each have at least one spur gear and at least one bevel gear and either the spur gears or the bevel gears of adjacent gearwheel groups mesh.

The particular advantage of this motorcycle case lies in the standardized first gearwheel group, which comprises both a bevel gear and also a spur gear. In this way, both parallel and angled embodiments of the gear mechanism can be implemented with the first gearwheel group. While the axes of rotation of all the gearwheel groups are arranged parallel to one another in the case of a parallel embodiment, with an angled embodiment the axis of rotation of at least one gearwheel group is not arranged parallel to the other gearwheel groups.

According to one aspect of the invention, a manually operable control element can be provided, wherein the gearwheel mechanism is driven by operating the control element and the two case parts are displaced relative to each other. By using the manually operable control element, the motorcycle case can be adjusted simply and uncomplicatedly, the motorcycle case not being dependent, for example, on fault-prone electronics and/or a charged electric battery.

Advantageously, the gearwheel mechanism has a first and a second gear mechanism at a distance therefrom, wherein a plurality of identical first and a plurality of identical second gearwheel groups are provided. The first gear mechanism comprises a first and a second gearwheel group, and the second gear mechanism comprises a further first and a further second gearwheel group, wherein the first gear mechanism is arranged between a first side wall of the one case part and an opposite first side wall of the other case part. The second gear mechanism is arranged between a second side wall of the one case part, opposite to the first side wall, and an opposite second side wall of the other case part. As a result of the arrangement of a second gear mechanism, the displacement force which is applied to the two case parts to adjust the storage volume can be applied symmetrically to the case parts.

According to a refinement, the control element is coupled to the first and the second gear mechanism, so that when the control element is operated, the two gear mechanisms run synchronously. The control element coupled to the first and second gear mechanism creates a simple mechanical solution for the synchronous operation of the two gear mechanisms, wherein the synchronous operation permits a more uniform introduction of the displacement force to the two case parts. At the same time, jamming of the case parts is avoided.

For example, each first gearwheel group drives at least one output gear, wherein the output gears of the first and of the second gear mechanism are each designed to transmit a displacement force between the two case parts. In particular, eccentrically mounted output levers, which are connected to one of the case parts, are arranged on the output gears. At each output gear, the rotational movement or the torque is converted into a displacement movement or displacement force, as a result of which the case parts can be displaced uniformly relative to each other.

Advantageously, both gear mechanisms each have a plurality of output gears, in particular wherein the first gearwheel group meshes directly with a first output gear and also with the second gearwheel group, which in turn meshes with the second output gear, so that when the first gearwheel groups are actuated, the two output gears of each gear mechanism are rotated in different directions. As a result of the use of a plurality of output gears, the displacement force needed to displace the two case parts can be applied more uniformly to the case parts. The use of two output gears has proven to be particularly advantageous, since a symmetrical introduction of force to the case parts is made possible and, at the same time, the number of output gears is kept as low as possible for reasons of cost and weight.

According to one aspect of the invention, the output gears of the two gear mechanisms are spur gears, which mesh with the spur gears of the first and second gearwheel group. The meshing spur gears transmit the torque between the output gears and the two gearwheel groups, their axes of rotation being arranged parallel to each other. This is important in particular for a rear case arranged centrally behind the motorcycle rider, since here no convexly designed case wall and, in consequence, no inclined arrangement of the axes of rotation is needed.

According to a further aspect of the invention, the output gears formed as spur gears are provided with straight-cut or helical teeth. Straight-cut and helical teeth have various advantages and disadvantages. For example, helical teeth offer improved quiet running of the engaged gears as compared with straight-cut teeth but in operation generate an axial force component which has to be absorbed by the bearing system.

Alternatively, the output gears can also be designed as bevel gears, the axes of rotation of the output gears being arranged at an angle to the axes of rotation of the gearwheel groups that mesh with the output gears. In this way, the output gears can be positioned more individually.

In one design variant, the first gearwheel groups of the two gear mechanisms each have a further spur gear. These are arranged at the side of and in direct contact with the associated bevel gear, wherein the further spur gear is coupled to the bevel gear and has gearwheels that rotate together and are assigned to one axis of rotation. As a result of this further stage on the first gearwheel groups, different transmission ratios between the first gearwheel group and the meshing second gearwheel group, and the first gearwheel group and the meshing output gear are possible, it being possible for their axes of rotation to be arranged in parallel because of the spur gearing.

According to one embodiment, the two gear mechanisms are arranged in mirror-image fashion relative to a mirror plane. As a result, the axes of rotation of the respective mirror-image gear mechanisms are aligned. This arrangement is suitable in particular for a rear case, which is attached behind a motorcycle rider. In this, no aerodynamic design on one side of the motorcycle case is necessary, for which reason the gear mechanisms of the motorcycle case can be designed to be mirror-identical for simplicity.

According to one aspect of the invention, in at least one gear mechanism the bevel gear of the first gearwheel group meshes with the bevel gear of the second gearwheel group and the axes of rotation of these meshing gearwheel groups are arranged at an angle to each other, in particular wherein the side walls of the motorcycle case that are associated with this gear mechanism bulge out convexly. The meshing bevel gears have the advantage that their associated axes of rotation can be arranged at an angle to each other, so that the gear mechanism design is matched to the convex side wall. This permits an aerodynamic design of a side wall of the motorcycle case with, at the same time, the largest possible storage volume.

In addition or alternately to the aforementioned aspects, in at least one gear mechanism spur gears of the gearwheel groups can mesh and the axes of rotation of these meshing gearwheel groups are arranged parallel to each other, i.e., the axes of rotation of the meshing spur gears are arranged parallel to each other. If a further gear mechanism having an angled axis of rotation arrangement according to the aforementioned aspect is already used in the motorcycle case, the parallel arrangement described relates to the other gear mechanism.

The gear mechanisms are preferably mounted on the inner case part and are coupled to the outer case part via output levers.

The invention will be explained below by using various exemplary embodiments, which are shown in the appended drawings.

DETAILED DESCRIPTION OF THE DRAWINGS

Figure 1:
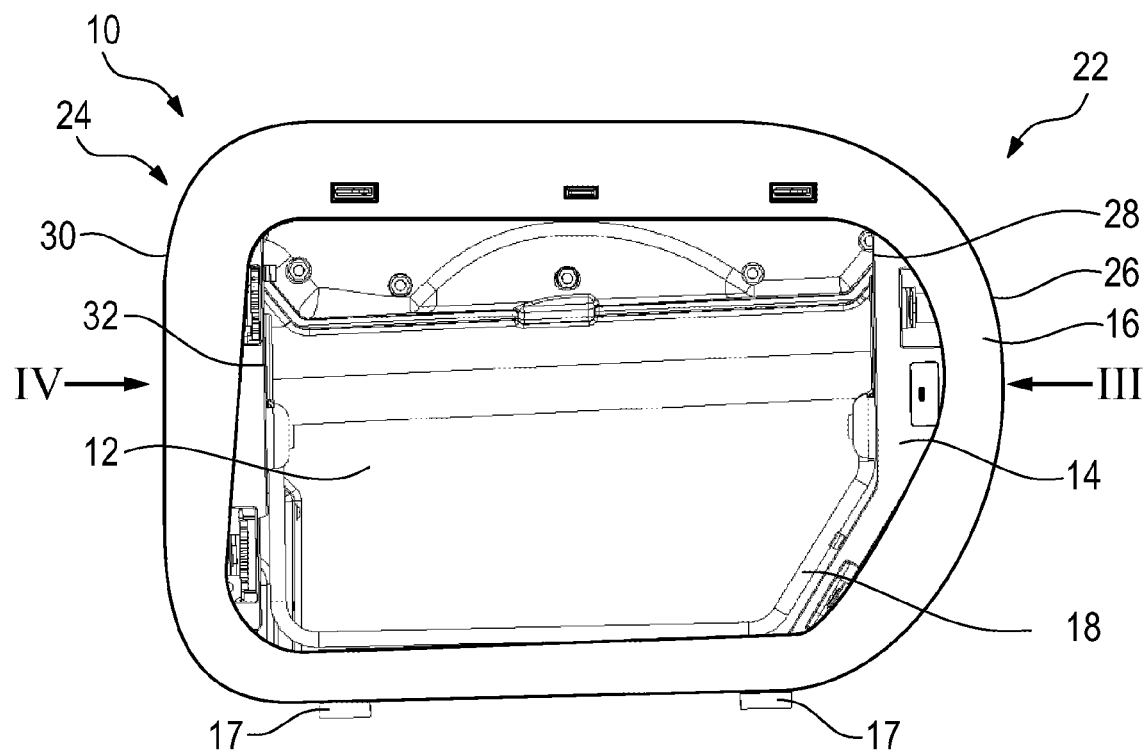
FIG. 1 shows a motorcycle case according to the invention according to one embodiment in a front view, the motorcycle case being illustrated as opened.

FIG. 1 shows an embodiment of a motorcycle case 10, which is used to transport objects which are intended to be carried along on a motorcycle. Because of its special aerodynamic shape, this embodiment is particularly suitable as a side case for a motorcycle.

The motorcycle case 10 has a flap (not illustrated) which can be opened and closed in order to be able to lay objects in a storage compartment 12 of the motorcycle case 10 and then to prevent these objects from falling out of the motorcycle case 10. In all the figures shown, the flap is not illustrated for the improved visibility of the other components.

In addition, the motorcycle case 10 has an inner and outer case part 14, 16, which are displaceable relative to each other in order to adapt the storage volume of the motorcycle case 10 variably. For this purpose, the motorcycle case 10 is equipped with a bow-shaped control element 18, with which the storage volume can be adjusted by hand.

The motorcycle case substantially comprises two half shells, which are set up with the open sides on each other and are inserted into each other. The inner half shell is formed by an inner case part 14. The outer half shell is divided in two and comprises an annular, outer case part 16 and a shell-like flap (not shown), which is attached to the outer case part 16 such that it can be pivoted to open the motorcycle case 10 (see pivot bearing 17).

Figure 2:
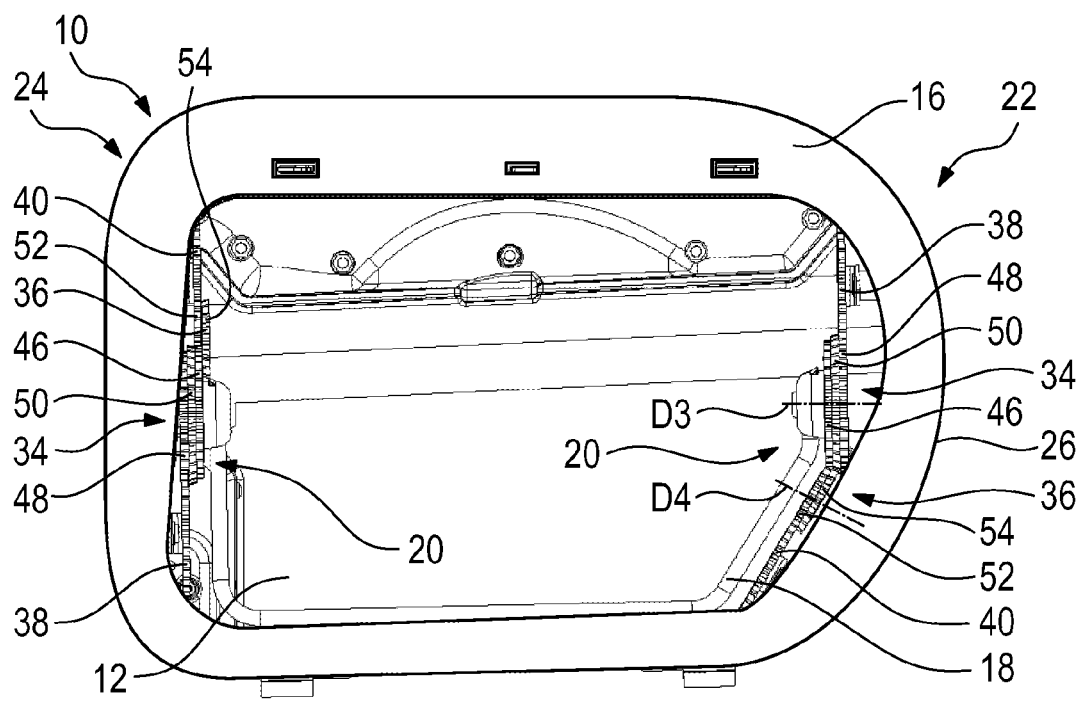
FIG. 2 shows the motorcycle case from FIG. 1 in a further front view, the two gear mechanisms of the motorcycle case being illustrated as exposed for complete visibility.

The control element 18 has two end positions, which correspond to the largest possible and smallest possible storage volume of the motorcycle case 10. In FIGS. 1 and 2, the control element 18 is directed downward and is also located in an end position. In a second end position according to FIGS. 7 and 8, the control element 18 is directed upward.

In addition, the motorcycle case 10 is equipped with a gearwheel mechanism 20 (see FIG. 2), which converts the rotational movement of the control element 18 into a translational relative movement of the two case parts 14, 16 relative to each other during the adjustment of the storage volume.

The control element 18 is coupled to the gearwheel mechanism 20, in order to forward the pivoting movement executed by hand by the operator to the gearwheel mechanism 20.

The gearwheel mechanism 20 itself in the embodiment according to FIGS. 1 to 6 comprises a first and a second gear mechanism 22, 24. The two gear mechanisms 22, 24 are operated synchronously, since the first and second gear mechanisms 22, 24 are co-rotationally coupled to one another by the manually operable control element 18. An overview of the gearwheel mechanism 20 with the two gear mechanisms 22, 24 can be gathered from FIG. 2, the inner case part 14 not being illustrated here for improved clarity.

The two gear mechanisms 22, 24, which are supported on the inner case part 14, are used to transmit the displacement force, which is needed to displace the two case parts 14, 16 toward each other, uniformly to the case parts 14, 16.

Alternatively, the gearwheel mechanism 20 can also comprise only one gear mechanism (not illustrated), given correspondingly good mounting of the two case parts 14, 16.

Since, in the present embodiment, an aerodynamic design is provided on a first, convex side wall 26 of the outer case part 16, the first gear mechanism 22 located behind this side wall 26 in the direction of the storage compartment 12 would be matched appropriately to the convex shape of the side wall 26, in order to maximize the storage volume as far as possible. Here, the first side wall 26 is the side that faces the airstream following the attachment of the motorcycle case 10 to a motorcycle.

As shown in FIG. 1, the first gear mechanism 22 is arranged between the first side wall 26 of the outer case part 16 and an opposite first side wall 28 of the inner case part 14. The second gear mechanism 24 is in turn arranged between a second side wall 30 of the one case part, opposite to the first side wall 26, here the outer case part 16, and an opposite second side wall 32 of the other case part, here the inner case part 14. The second side walls 30, 32 are substantially flat.

Figure 3:
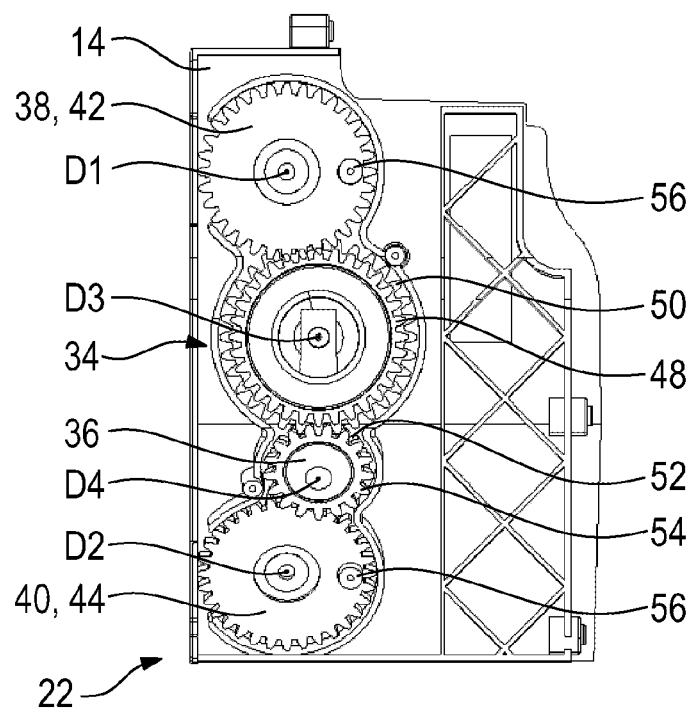
FIG. 3 shows a first gear mechanism of the motorcycle case from FIG. 1 seen in the direction III according to FIG. 1, the outer case part not being illustrated.
Figure 4:
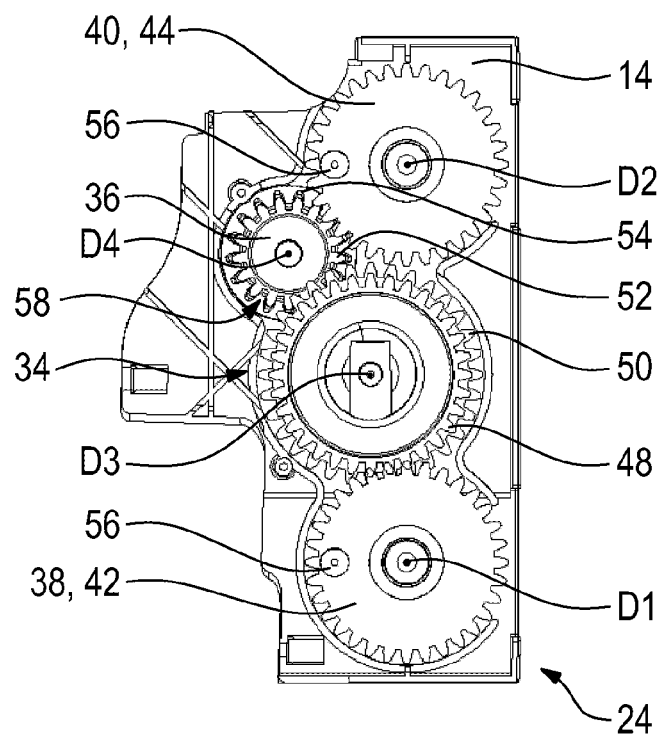
FIG. 4 shows a second, opposite gear mechanism of the motorcycle case from FIG. 1 seen in the direction IV according to FIG. 1, the outer case part not being illustrated.
Figure 5:
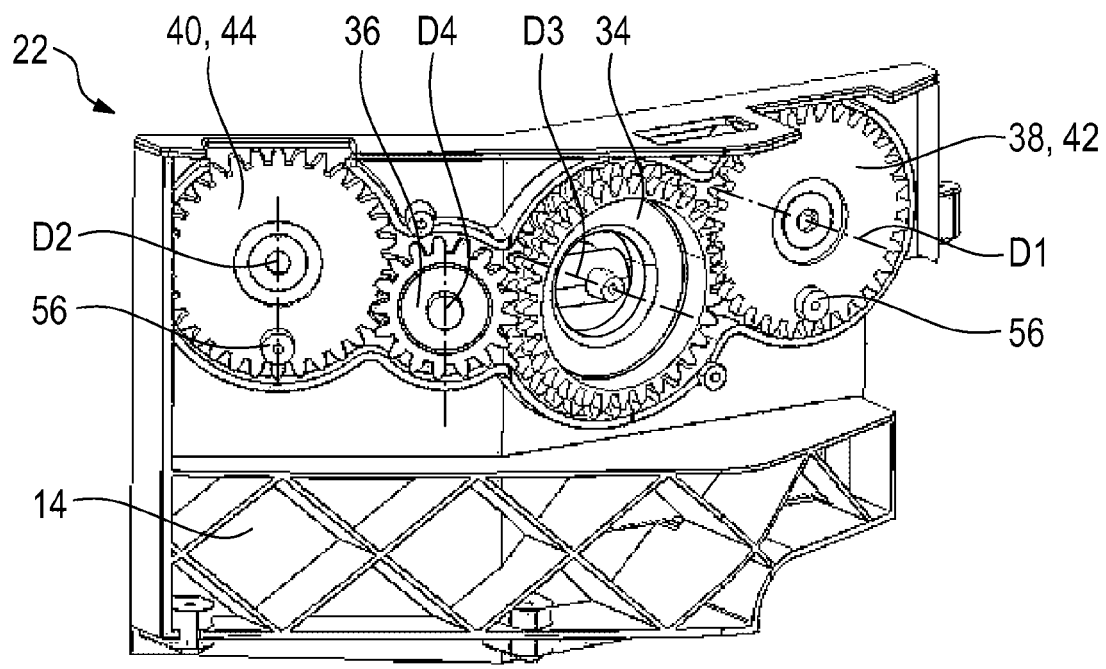
FIG. 5 shows the first gear mechanism of the motorcycle case from FIG. 1 in a perspective view, a portion of the inner case part additionally being illustrated.
Figure 6:
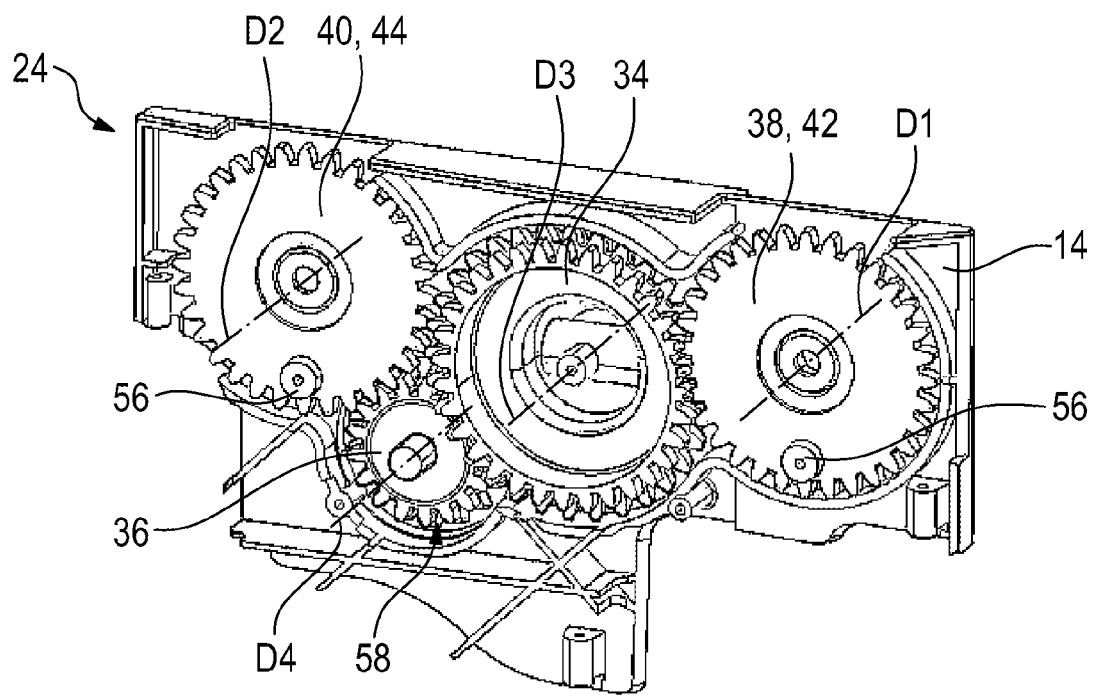
FIG. 6 shows the second, opposite gear mechanism of the motorcycle case from FIG. 1 in a perspective view, a portion of the inner case part additionally being illustrated.

In the following, the common features of the two gear mechanisms 22, 24 will be discussed with reference to FIGS. 3 and 4. Both the first and also the second gear mechanism 22, 24 each comprise a first and a second gearwheel group 34, 36 and a first and a second output gear 38, 40, the output gears 38, 40 being designed as spur gears 42, 44. Each of the output gears 38, 40 has an individual axis of rotation D1, D2.

The first gearwheel group 34 (see FIG. 2) has two spur gears 46, 48 and a bevel gear 50 located in between, while the second gearwheel group 36 has a spur gear 52 and a bevel gear 54. The gearwheels of a gearwheel group 34, 36 in turn each have a common axis of rotation D3, D4 and are each co-rotationally coupled to each other.

The first gearwheel groups 34 of the two gear mechanisms 22, 24 function as output gears. From the first gearwheel groups 34, the drive torque is divided in the direction of the two output gears 38, 40. The first output gear 38 is driven directly via the first gearwheel group 34, and the second output gear 40 is driven via the interposed second gearwheel group 36. The two output gears 38, 40 of the two gear mechanisms 22, 24 are rotated in different directions as a result.

The first gear mechanism 22 differs from the second gear mechanism 24 in the different coupling of the first to the second gearwheel group 34, 36. To clarify the different coupling, FIGS. 2 to 6 will now be considered in more detail.

In the first gear mechanism 22, the bevel gear 50 of the first gearwheel group 34 meshes with the bevel gear 54 of the second gearwheel group 36, the axes of rotation D3, D4 of the meshing gearwheel groups 34, 36 being arranged at an angle to each other.

In the second gear mechanism 24, on the other hand, the spur gear 46 of the first gearwheel group 34 meshes with the spur gear 52 of the second gearwheel group 36, the axes of rotation D3, D4 of the meshing gearwheel groups 34, 36 being arranged parallel to each other.

In the exemplary embodiment shown, the bevel gear 54 of the second gearwheel group 36 has a smallest root circle diameter which is larger than the root circle diameter of the spur gear 52 of the second gearwheel group 36 which is in direct contact with the bevel gear 54. As a result, a shoulder 58 is formed on the first gearwheel group 34 (see FIG. 8), which can be used as an axial stop for securing the second gearwheel group 36.

The formation of the shoulder 58 is, however, to be understood merely by way of example. Thus, the smallest root circle diameter of the bevel gear 54 could also be of the same size as the root circle diameter of the spur gear 52, if the teeth of the bevel gear 54 are offset relative to those of the spur gear 52.

As already mentioned, the first gearwheel groups 34 are equipped with two spur gears 46, 48, although in the first gear mechanism 22 only the first spur gear 46 meshes with a further spur gear 42. Likewise, the first gearwheel groups 34 are equipped with a bevel gear 50, although this bevel gear 50 in the second gear mechanism 24 does not mesh with a further bevel gear. This specific design of the first gearwheel group 34 permits an identical first gearwheel group 34 to be used in the first and also in the second gear mechanism 22, 24. Here, it should be noted that the first gearwheel groups 34 of the two gear mechanisms 22, 24 are arranged to be mirror-inverted relative to each other.

A respective output lever mounted eccentrically with respect to the respective axis of rotation of the output gear 38, 40 and connected to the outer case part 16 is arranged on the output gears 38, 40. These output levers are the connecting links between the gear mechanisms 22, 24 and the outer case part 16. The mountings 56 of the output levers are shown in FIGS. 3, 4, 5 and 6, the output levers themselves not being illustrated. By displacing the output levers, the outer half shell, that is to say the outer case part 16 with the flap, is displaced outward and away from the inner case part 14 or toward the inner case part 14 in order to change the storage volume of the motorcycle case 10.

The torque flow during the displacement of the storage volume originates from the control element 18, and is then divided among the first gearwheel groups 34 of the two gear mechanisms 22, 24, since each first gearwheel group 34 is co-rotationally coupled to a respective end of the control element 18. The torque flow is then again divided among the first gearwheel groups 34 and leads from the first gearwheel groups 34 directly to the first output gears 38 and, respectively, via the second gearwheel groups 36 to the second output gears 40.

Figure 7:
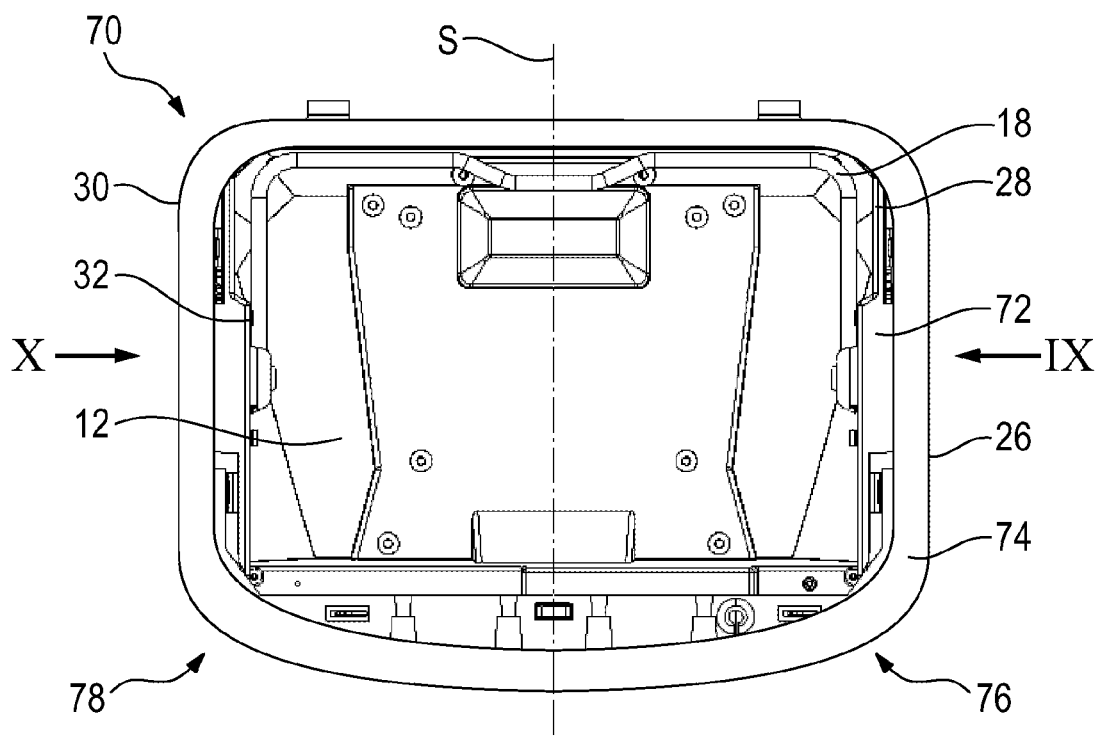
FIG. 7 shows a motorcycle case according to the invention according to a further embodiment in a front view, the motorcycle case being illustrated as opened.

FIG. 7 shows a further embodiment of the motorcycle case 70. This motorcycle case 70 is suitable, for example, as a rear case. As opposed to the embodiment described previously, the outer case part 72 has no convexly shaped first side wall 26. This is not needed, since the motorcycle case 70 is arranged in the wind shadow of a motorcycle rider when it is used as a rear case.

The inner case part 74 of the motorcycle case 70 differs from the inner case part 14 of the motorcycle case 10, since an adaptation of the shape is necessary because of the changed outer case part 72 and the changed first gear mechanism 76.

The fact that the side wall 26 is not shaped convexly means that no gear mechanism with axes of rotation D3, D4 of the first and second gearwheel group 34, 36 arranged at an angle to each other is needed either. Therefore, the first gear mechanism 76 of this embodiment differs from the described first gear mechanism 22 of the previous embodiment. More precisely, the first gear mechanism 76 of this embodiment corresponds to the previous second gear mechanism 24.

Figure 8:
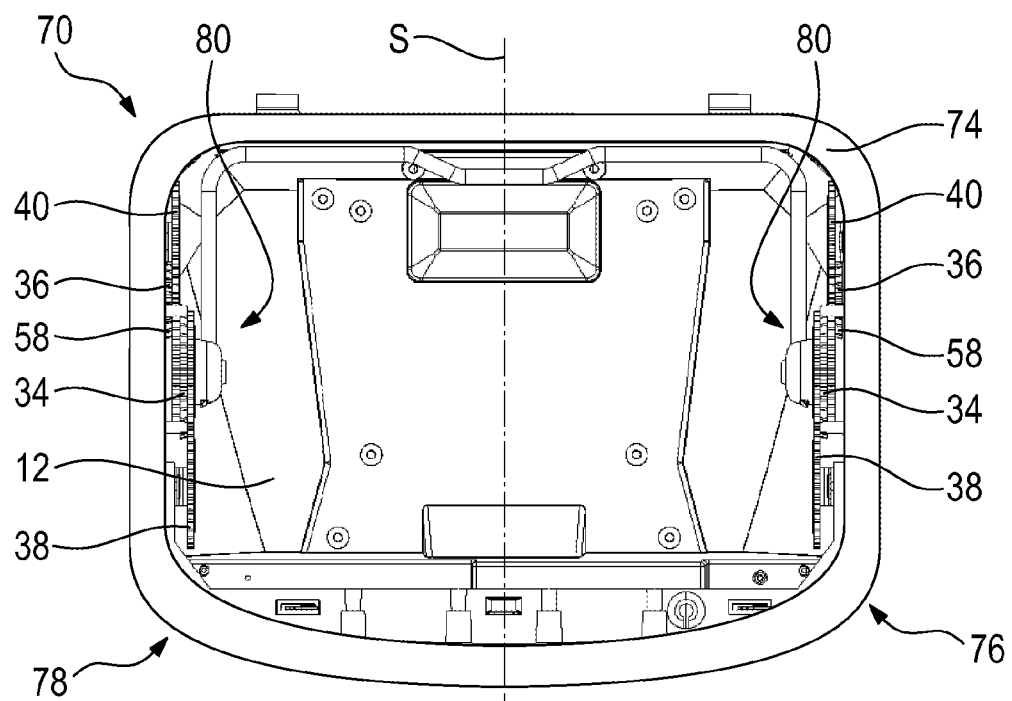
FIG. 8 shows the motorcycle case from FIG. 7 in a further front view, the two gear mechanisms of the motorcycle case being illustrated as exposed for complete visibility.
Figure 9:
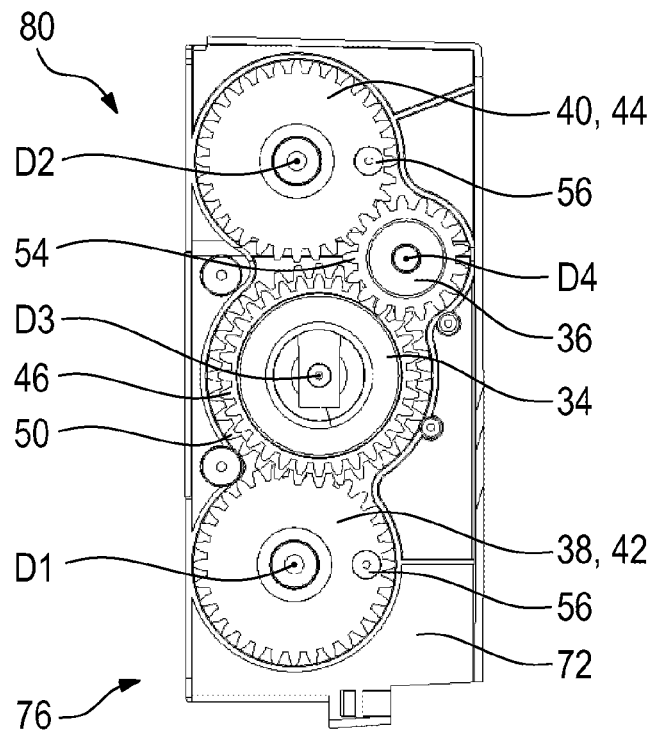
FIG. 9 shows the first gear mechanism of the motorcycle case from FIG. 7 seen in the direction IX, the outer case part not being illustrated.
Figure 10:
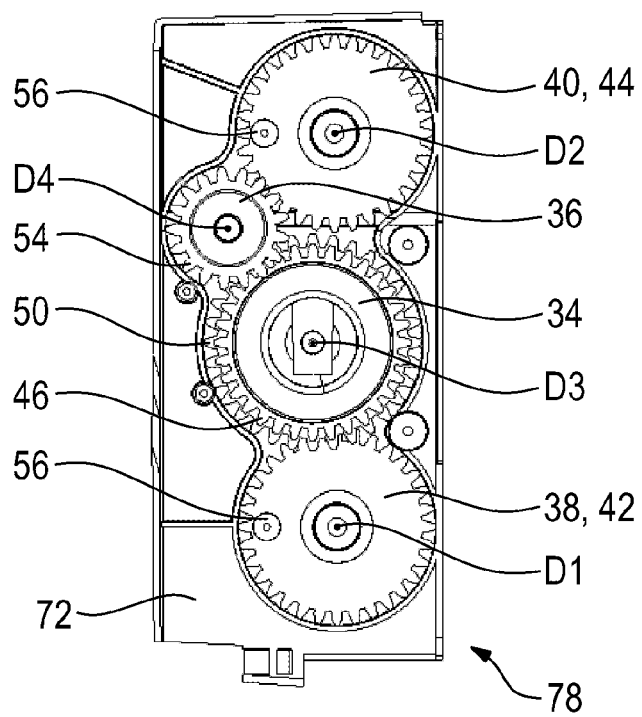
FIG. 10 shows the second, opposite gear mechanism of the motorcycle case from FIG. 7 seen in the direction X, the outer case part not being illustrated.
Figure 11:
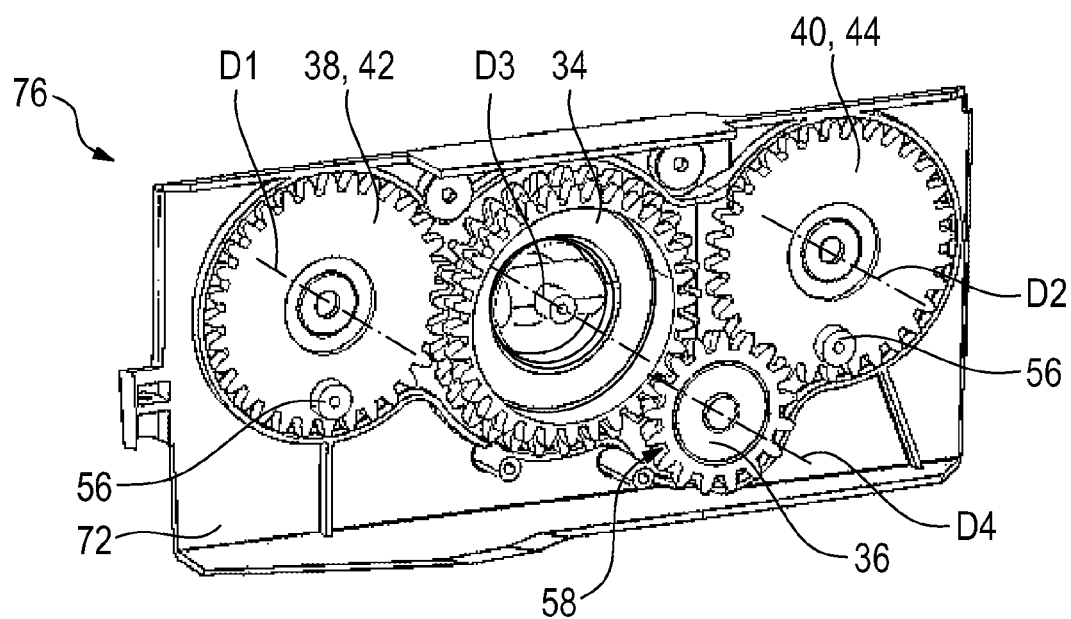
FIG. 11 shows the first gear mechanism of the motorcycle case from FIG. 7 in a perspective view, a portion of the inner case part additionally being illustrated.
Figure 12:
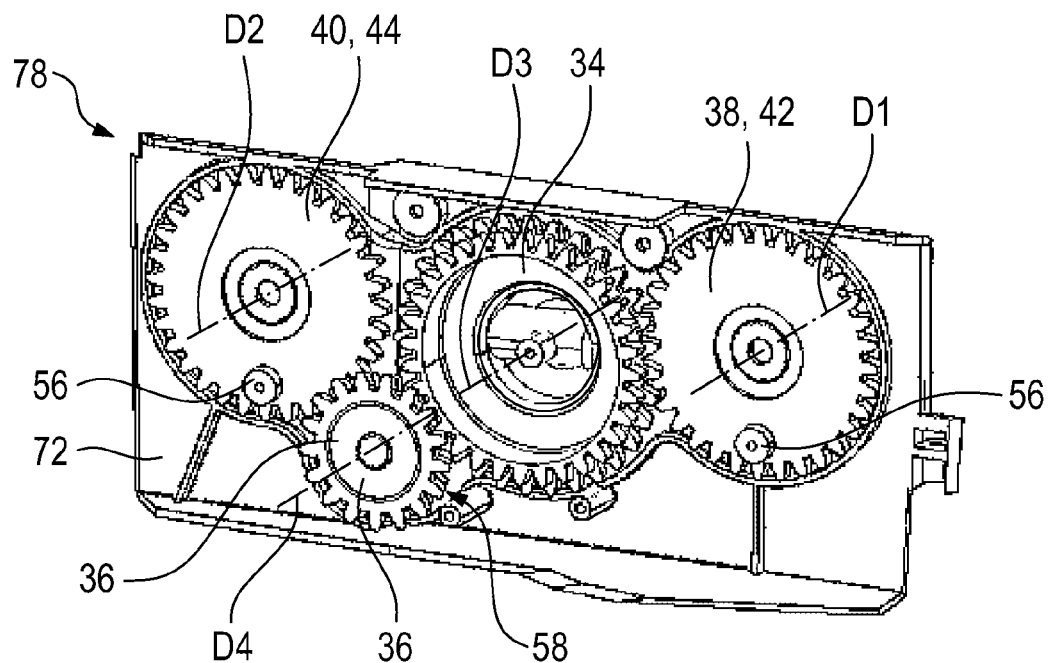
FIG. 12 shows the second, opposite gear mechanism of the motorcycle case from FIG. 7 in a perspective view, a portion of the inner case part additionally being illustrated.

The second gear mechanism 78 in turn corresponds to the first gear mechanism 76, the two gear mechanisms 76, 78 being arranged in mirror-image fashion relative to each other about a mirror plane S (see FIG. 8). As a result, the axes of rotation D1, D2, D3, D4 of the respective mirror-identical gearwheel groups 34, 36 and output gears 38, 40 are aligned.

As a consequence, the first and second gear mechanisms 76, 78 have all the above-described features and also the mode of action of the second gear mechanism 24. Together, the two gear mechanisms 76, 78 form the gearwheel mechanism 80 of the motorcycle case 70, its mode of action being analogous to the gearwheel mechanism 20 of the motorcycle case 10.

What is claimed is:

1. A motorcycle case, comprising:
   an inner case part which is fastenable to a motorcycle;
   an outer case part which is connected to the inner case part and is displaceable laterally relative to the inner case part; and
   a driven gearwheel mechanism coupling the inner case part and the outer case part, wherein a width of the motorcycle case is adjustable by displacing the outer case part relative to the inner case part;
   wherein the driven gearwheel mechanism comprises at least a first gearwheel group and a second gearwheel group which each have a plurality of gears coupled to one another, rotating together and assigned to an axis of rotation, wherein respective teeth of the first gearwheel group and the second gearwheel group mesh;
   wherein the first gearwheel group and the second gearwheel group each have at least one spur gear and at least one bevel gear and either the spur gear of the first gearwheel group and the spur gear of the second gearwheel group mesh or the bevel gear of the first gearwheel group and the bevel gear of the second gearwheel group mesh.

2. The motorcycle case according to claim 1, further comprising a manually operable control element, wherein the driven gearwheel mechanism is driven by operating the control element and the inner case part and the outer case part are displaced relative to each other.

3. The motorcycle case according to claim 2:
   wherein the driven gearwheel mechanism has a first gear mechanism and a second gear mechanism at a distance therefrom;
   wherein a plurality of identical first gearwheel groups and a plurality of identical second gearwheel groups are provided;
   wherein the first gear mechanism comprises a first gearwheel group and a second gearwheel group;
   wherein the second gear mechanism comprises a further first gearwheel group and a further second gearwheel group;
   wherein the first gear mechanism is disposed between a first side wall of the outer case part and an opposite first side wall of the inner case part;
   wherein the second gear mechanism is disposed between a second side wall of the outer case part, opposite to the first side wall, and an opposite, second side wall of the inner case part.

4. The motorcycle case according to claim 3, wherein the control element is coupled to the first gear mechanism and the second gear mechanism such that when the control element is operated, the first gear mechanism and the second gear mechanism run synchronously.

5. The motorcycle case according to claim 3, wherein the first gearwheel group drives at least one output gear and the further first gearwheel group drives at least one further output gear, wherein the output gear and the further output gear each transmit a displacement force between the inner case part and the outer case part by a respective eccentrically mounted output lever which is connected to one of the inner case part and the outer case part.

6. The motorcycle case according to claim 5, wherein the first gearwheel group meshes directly with the output gear and also with the second gearwheel group, which in turn meshes with a second output gear, such that when the first gearwheel group is actuated, the output gear and the second output gear are rotated in different directions.

7. The motorcycle case according to claim 6, wherein the output gear is a spur gear which meshes with the spur gear of the first gearwheel group.

8. The motorcycle case according to claim 3, wherein the first gearwheel group has a further spur gear arranged at a side of and in direct contact with the bevel gear of the first gearwheel group and wherein the further spur gear is coupled to the bevel gear of the first gearwheel group and has gearwheels that rotate together and are assigned to one axis of rotation.

9. The motorcycle case according to claim 3, wherein the first gear mechanism and the second gear mechanism are disposed in mirror-image fashion relative to a mirror plane.

10. The motorcycle case according to claim 3, wherein in at least one gear mechanism the bevel gear of the first gearwheel group meshes with the bevel gear of the second gearwheel group and the axes of rotation of these meshing gearwheel groups are disposed at an angle to each other.

11. The motorcycle case according to claim 3, wherein in at least one gear mechanism, spur gears of the gearwheel groups mesh and the axes of rotation of these meshing gearwheel groups are disposed parallel to each other.

* * * * *